United States Patent [19]
Asprey

[11] Patent Number: 5,380,206
[45] Date of Patent: Jan. 10, 1995

[54] PERSONALIZABLE ANIMATED CHARACTER DISPLAY CLOCK

[76] Inventor: Margaret S. Asprey, 422 Traverso Ct., Los Altos, Calif. 94022

[21] Appl. No.: 28,321

[22] Filed: Mar. 9, 1993

[51] Int. Cl.6 .............. G09B 19/00; G09B 19/12; G04B 19/04; G04B 19/06
[52] U.S. Cl. .................... 434/257; 434/304; 368/228; 368/229
[58] Field of Search .............. 368/223, 224, 225, 228, 368/229, 141; 434/99, 94, 257, 304, 428; 446/321, 391, 387

[56] References Cited

U.S. PATENT DOCUMENTS

| | | | |
|---|---|---|---|
| 672,357 | 4/1901 | Davison | 368/229 |
| 833,448 | 10/1906 | Vall et al. | 446/387 X |
| 1,989,881 | 2/1935 | Putnam | 368/229 |
| 2,199,049 | 4/1940 | Greenberg | 446/391 X |
| 2,369,031 | 2/1945 | Engle | 446/387 |
| 2,927,400 | 3/1960 | Bailey | 446/387 X |
| 3,339,453 | 9/1967 | Udich | 434/94 X |
| 4,020,586 | 5/1977 | Benner | 446/321 X |
| 4,258,478 | 3/1981 | Scott et al. | 434/94 |
| 4,297,724 | 10/1981 | Masuda et al. | 434/94 X |
| 4,466,743 | 8/1984 | Puff | 368/228 X |
| 4,776,796 | 10/1988 | Nossal | 434/94 |
| 4,993,987 | 2/1991 | Hull et al. | 446/391 X |
| 5,008,869 | 4/1991 | Dweck | 368/228 |
| 5,009,626 | 4/1991 | Katz | 446/391 |

FOREIGN PATENT DOCUMENTS

| | | | |
|---|---|---|---|
| 298923 | 1/1989 | European Pat. Off. | 434/99 |
| 752804 | 7/1956 | United Kingdom | 368/229 |
| 8911235 | 11/1989 | WIPO | 434/94 |

*Primary Examiner*—Gene Mancene
*Assistant Examiner*—Jeffrey A. Smith

[57] ABSTRACT

A personalizable animated character display (10) for transforming a face photograph (24) into a personalized animated character comprising a body image (20) and one or more movable body parts (12, 14). In the preferred embodiment, the animation is driven by a clock drive mechanism (30) and the display is configured to also serve the role of a clock. The display is made personalizable by providing an opening (22) in the character body image (20), through which the face on the personalizing face photograph (24) may be shown in such a position as to integrate with the character body image (20).

4 Claims, 5 Drawing Sheets

PERSONALIZABLE ANIMATED CHARACTER DISPLAY CLOCK

FIELD OF THE INVENTION

This invention relates to personalized or personalizable displays, specifically to displays combining personal images with character images, and to displays that animate personalized character images.

Background of the Invention

A popular way to display a photograph of an individual is to combine it with an image of a scene or a character. The combination personalizes the image of the scene or character, and provides a personal photo display with additional impact in terms of motivation, nostalgia, or imagination. Combining methods, whether they be photographic, collage, or otherwise, result in image displays that are static and provide no useful mechanism.

A prior art technique for personalizing books is to print book pages or covers with holes in them through which a photograph affixed behind the hole can be viewed. This technique allows the face of an individual in a photograph to "become" the face of a different character on each page. There are books which allow a child to see his or her face on characters dressed in clothing and performing tasks in a variety of situations. These characters are not animated in any way.

Clocks with rotating hands are useful mechanisms that have popularly been turned to the secondary task of animating displays of character images, such as popular characters from television shows and animated cartoons (e.g. Mickey Mouse TM watch). Such animated character displays take on interesting and nonsensical positions as the clock hands rotate, and are not expected to provide the kind of image quality and realism as do photographs. These prior-art animated character displays based on clocks are not personalizable, and do not have personal impact.

Clocks exist which are made with a photograph used as the background of the clock face. These clocks are little more than a photograph frame with a clock attached to the front or to the side. The photographs are static and do not relate to the moving CLOCK mechanism in any personal way.

Objects and Advantages

Accordingly, several objects and advantages of the present invention are:

(a) to provide a display which is both personalizable and animated;

(b) to provide a mechanism by which a static image of a person can be transformed into a moving image of a selected character type or animal identifiable with that person;

(c) to provide a personalizable, animated display that is also useful as a clock;

(d) to provide a personalizable, animated display that combines artwork of an idealized character with a photograph of a real person;

(e) to provide a clock or other animated display with a personalized image that can be modified.

Further objects and advantages are to provide a display to interest a child in a motivational character or a character that dynamically represents a child's specific interests (e.g. dance, sports, science, astronomy), to provide a humorous moving image of an adult, and so forth, while such display also serves a utilitarian purpose such as a clock, and thereby attracts more attention to itself. Furthermore, it is an advantage that the personalized device defies obsolescence because it can be re-personalized as the current owner ages or if the device is transferred to a new owner. Still further objects and advantages will become apparent from a consideration of the ensuing description and drawings.

BRIEF DESCRIPTION OF THE DRAWING FIGURES

Figure 1:
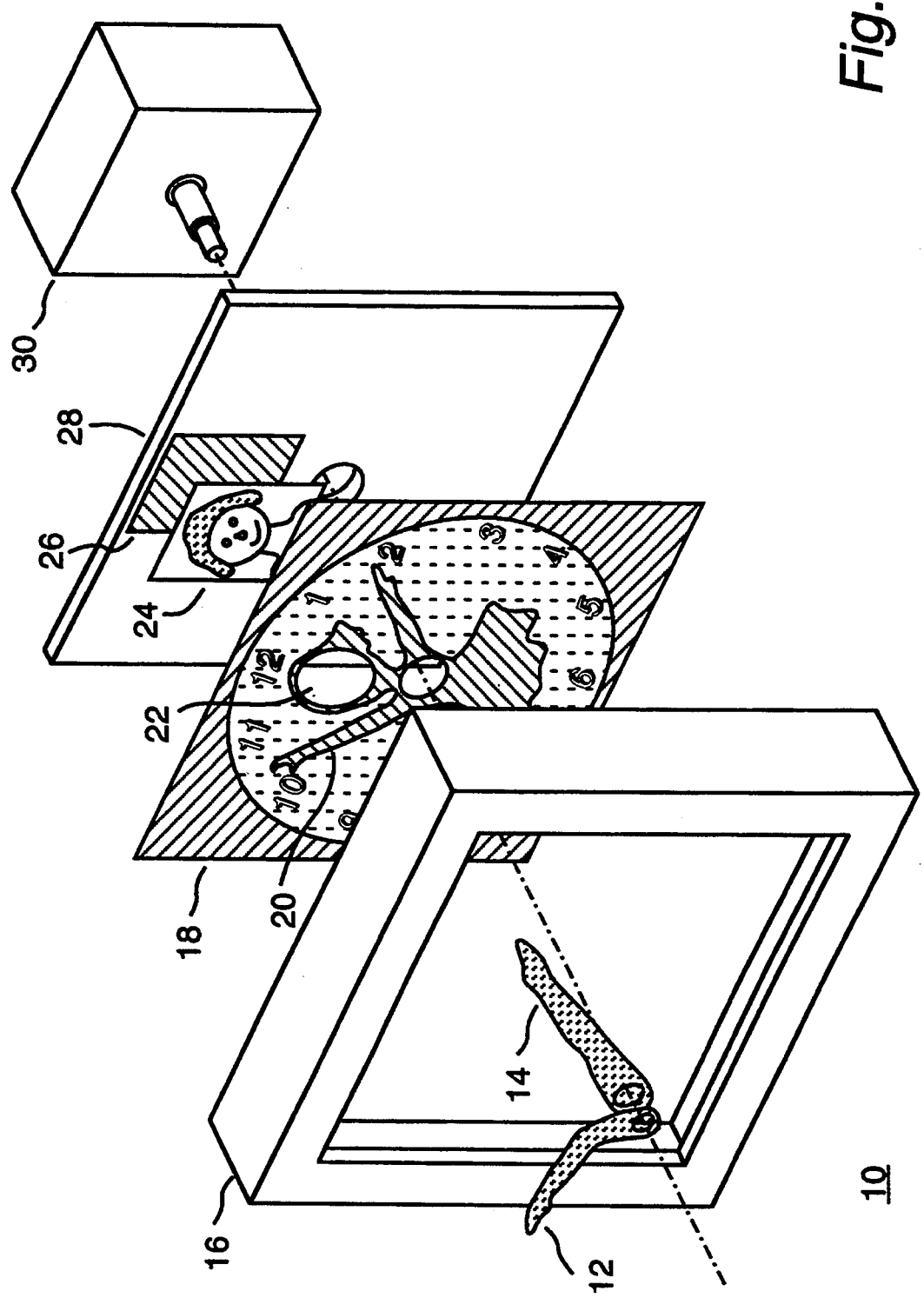
FIG. 1 shows an exploded view of a personalizable animated character display in perspective, in the preferred embodiment as a clock.

Reference Numerals in Drawings 10 a personalizable animated character display according to the present invention, embodied as a clock
12 character part used as hour hand
14 character part used as minute hand
16 display frame
18 clock face artwork
20 character body image
22 opening to expose face of photograph
24 personalizing photograph
26 photograph mounting adhesive
28 display backing board
30 clock drive mechanism
32 digitally stored artwork with character image
34 image scanner
36 computer with image compositing software
38 image printer
40 personalized artwork
42 human subject
44 colored screen
46 stored video artwork
48 video monitor
54 video camera
56 videographic compositing system
58 image printer

DETAILED DESCRIPTION OF THE INVENTION

FIG. 1 shows an exploded view of a personalizable animated character display 10 according to the present invention, in the form of a preferred embodiment as a clock. The structural elements of the display include a frame 16 and a backing board 28. Artwork representing a clock face 18 is separable from backing board 28. Artwork representing a character to be animated includes a body image 20 (shown as part of clock face artwork 18), movable parts to be used as clock hour hand 12 and minute hand 14, and a face opening 22 with a personalizing photograph 24. A conventional clock drive mechanism 30 rotates hour hand 12 and minute hand 14 to animate the character. An adhesive 26 holds photograph 24 in position behind face opening 22.

Elements 12–30 are assembled front-to-back as shown, such that elements 12–24 are visible from the front of display 10 and elements 26–30 are hidden. Backing board 28 is secured into frame 16, securing clock face artwork 18, in the manner of a conventional prior-art picture frame, using any form of clips, staples, slots, or other fastening means. Drive mechanism 30 is secured to backing board 28, with rotating shafts protruding through a hole in backing board 28, in the manner of a conventional prior-art clock, using any form of clips, adhesive, screws, or other fastening means. Character artwork parts used as clock hands 12 and 14 are secured to the shafts of drive mechanism 30 using a friction fit or any other conventional means. A transparent glass or plastic front cover (not shown) may optionally be secured to the frame by any conventional means to protect the artwork and moving parts.

Figure 2:
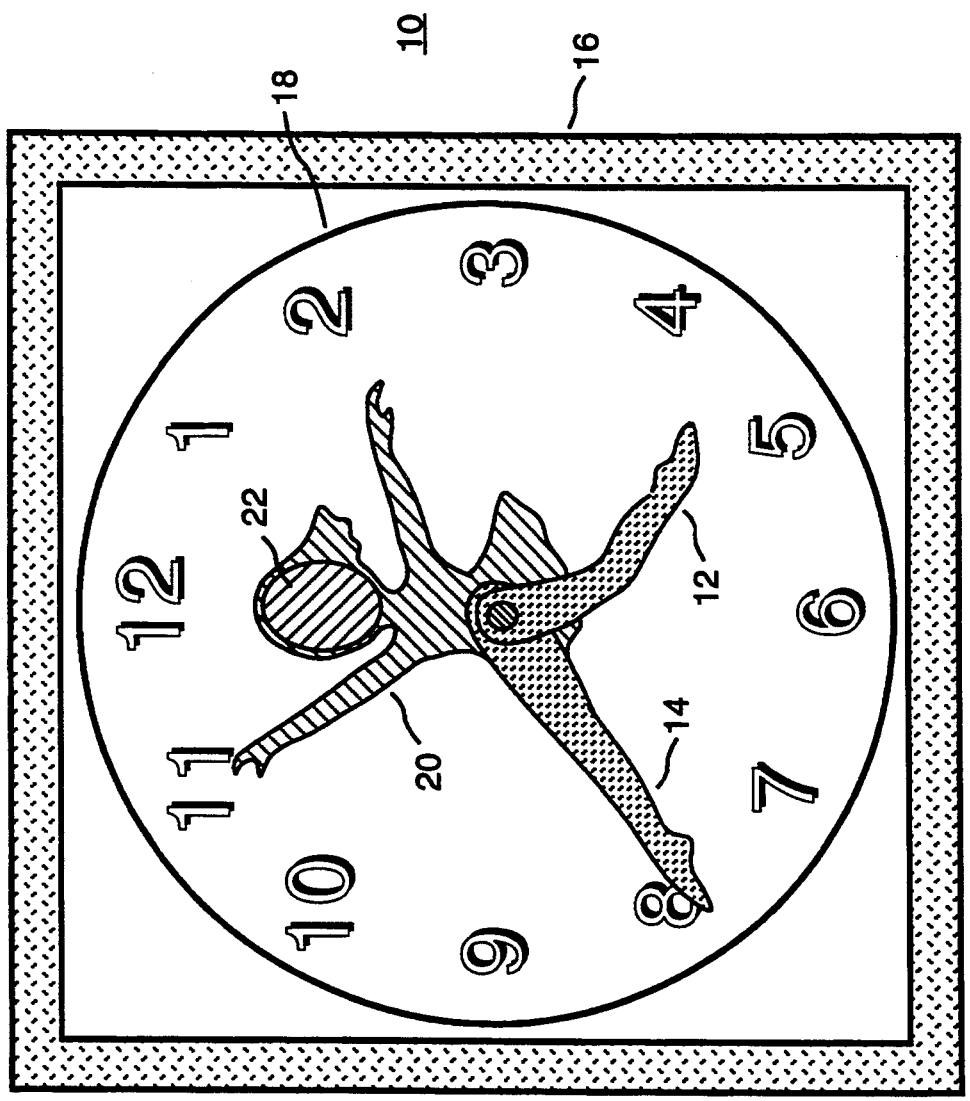
FIG. 2 shows a front view of an assembled personalizable animated character display, in the preferred embodiment as a clock.

FIG. 2 illustrates a front view of assembled personalizable animated character display 10, using the same reference numerals for the same elements as in FIG. 1. Personalizing photograph 24 is not shown, in order to emphasize the face opening. The preferred embodiment as a clock is illustrated here animating a ballerina character, using the character's legs as clock hands 12 and 14. The preferred embodiment as a clock can also animate arms or other body parts of other human or animal characters, depending on the artwork provided.

A key to the utility of display 10 is its capability of being personalized and repersonalized by inserting or affixing a photograph 24 (shown in FIG. 1) behind opening 22. The concept of personalizing a character image by affixing a photograph behind a face opening is well known in the prior art of static images, as in personalized books. The difficulty of exactly matching a photograph to a predetermined hole is well known, yet the technique is found to be quite acceptable when photo-realism of the personalized character image is neither required nor expected. In the case of a clock animating a character, twisted and ridiculous body configurations are fully expected, and realism is not. Deficiencies in fitting a face photograph to the character are easily tolerated, and do not significantly detract from the impact of the personalized character.

Other and more realistic compositing techniques are available for combining a personalizing face photograph with a character image, and plainly fall within the scope of the present invention. For example, in an alternative embodiment, a photograph would be trimmed and attached to the front of the character body artwork, rather than displayed through an opening. This approach would require more skill and effort in personalizing, and re-personalizing might be more difficult.

Other techniques are described below for producing personalized composite artwork as part of a personalized animated character display. The techniques described are all in the prior art, as are the techniques described above (photo behind opening and trimmed photo attached to front), but to the inventor's knowledge they have not previously been combined with an animated character display.

Figure 3:
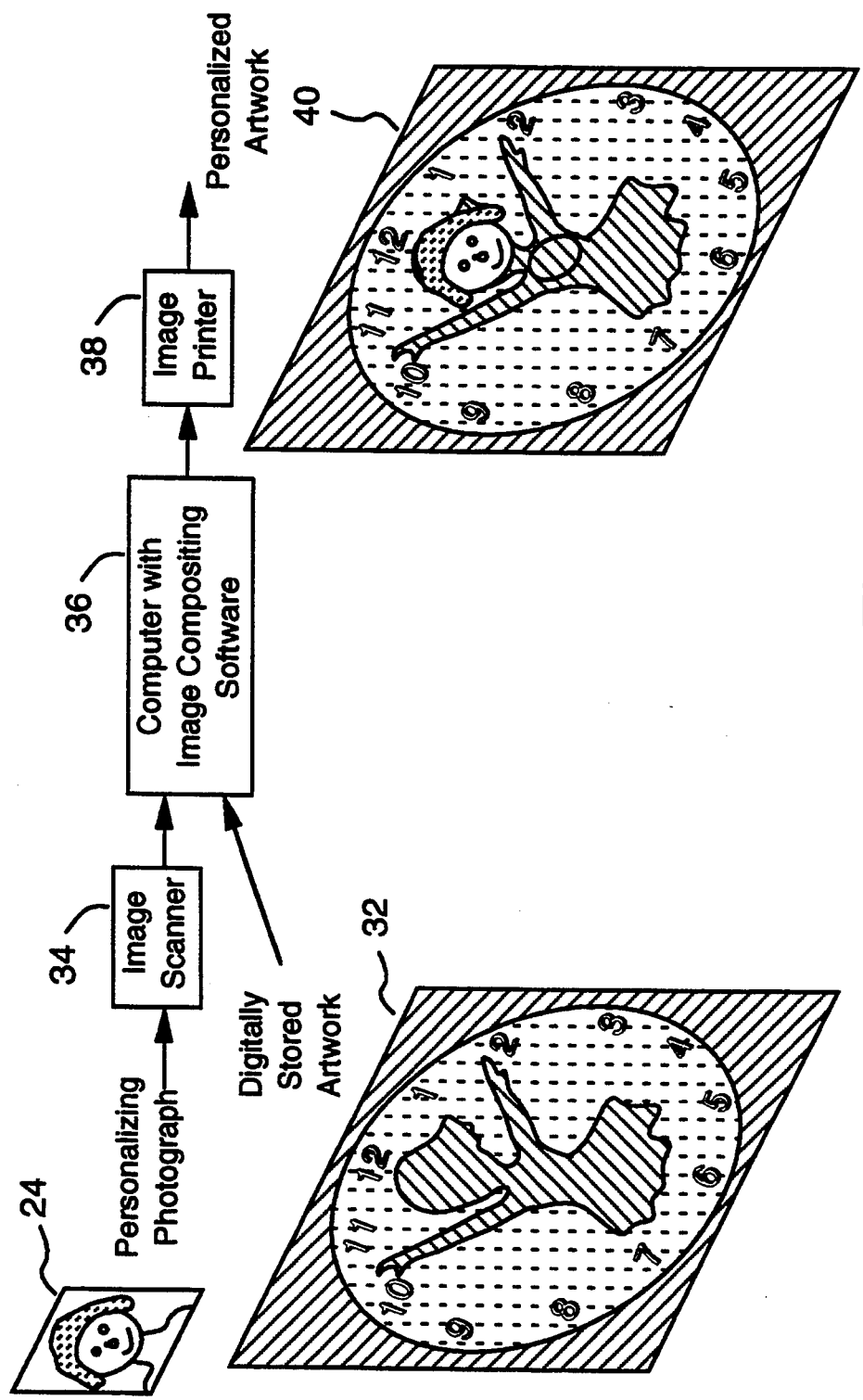
FIG. 3 shows an method of producing personalized artwork for the animated display by compositing a personalizing image with stored artwork that includes a character image.

FIG. 3 is a block diagram that illustrates an alternative process for combining personalizing photograph 24 with predetermined artwork, using a computer system. As illustrated, a stored artwork 32 representing the character body image and other fixed images relevant to the display (such as clock face artwork with numbers) is available in the computer system or as input to the computer system. Personalizing photograph 24 is converted to a digital image in the computer system through the use of an image scanner 34. A computer system with image compositing software 36 is used to combine stored artwork 32 with the digital representation of personalizing photograph 24, producing a digital composite representation which is subsequently reproduced via an image printer 38 to produce customized artwork 40. Modern application software programs such as Adobe Photoshop TM for Macintosh TM personal computers make it easy for nontechnical personnel of ordinary skill to perform the personalization operation as shown in FIG. 3, with no need for further knowledge of the internal workings of the computer system or its software.

While the approach of FIG. 3 requires some skill and more technology to personalize the animated display, it has potentially better image quality and certain other advantages in that not only the choice of personalizing photograph but also the choice of the character image to animate may be deferred until the personalization operation. For example, personalization might be done at the point of sale, as in the following scenario: a customer selects the product, and then at the point of sale chooses an astronaut character, provides a photo or poses to have his face imaged, and receives a finished artwork printout to complete the product.

In this alternative embodiment, the personalizable product might include clock hands for several possible character types, or clock hand artwork for the selected character could be included as part of the personalized artwork, to be cut out by the customer and secured to plain clock hands using a provided adhesive.

Figure 4:
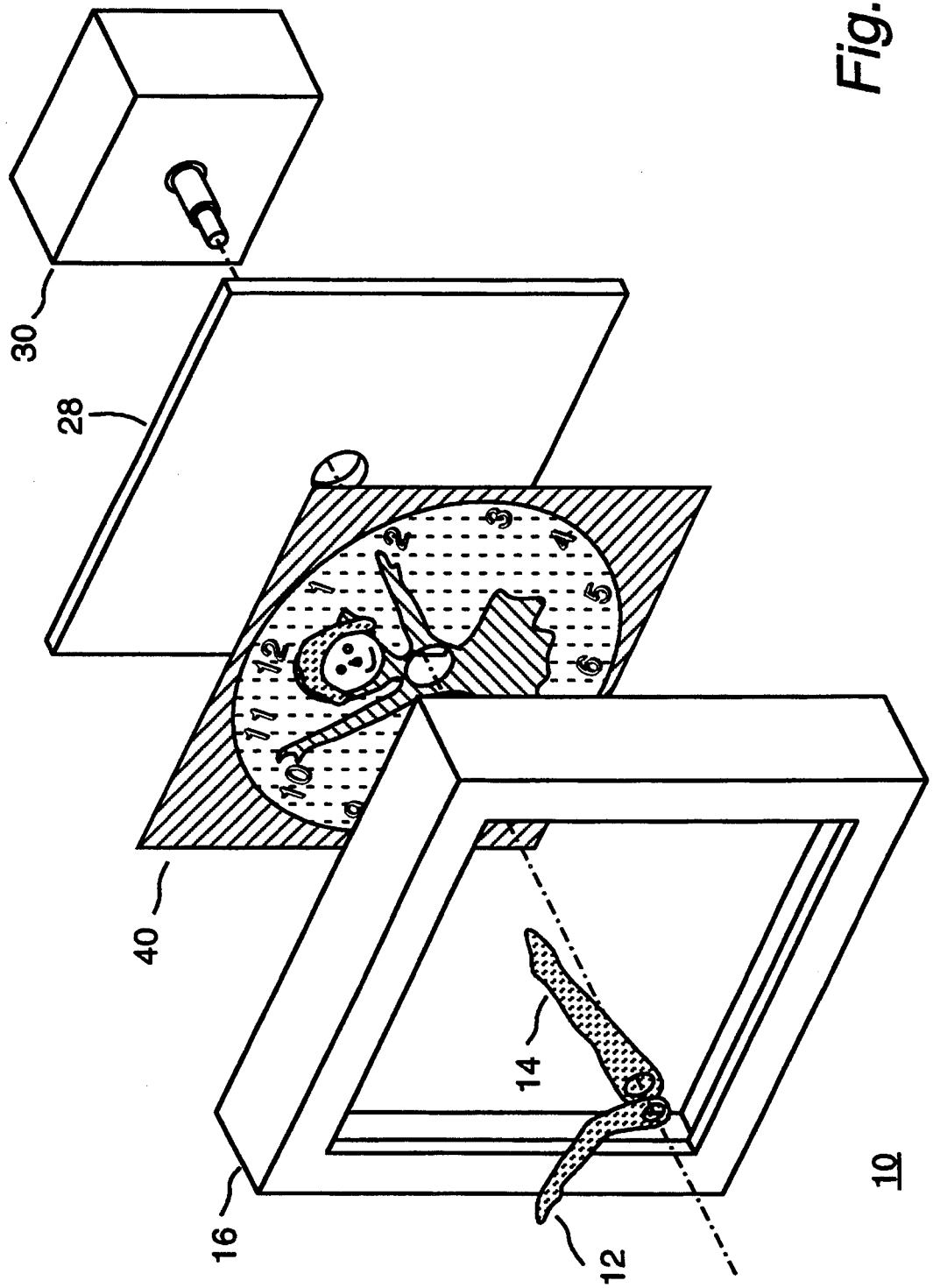
FIG. 4 shows an exploded view of another version of the invention embodied as a clock, using personalized artwork prepared as in FIG. 3.
Figure 5:
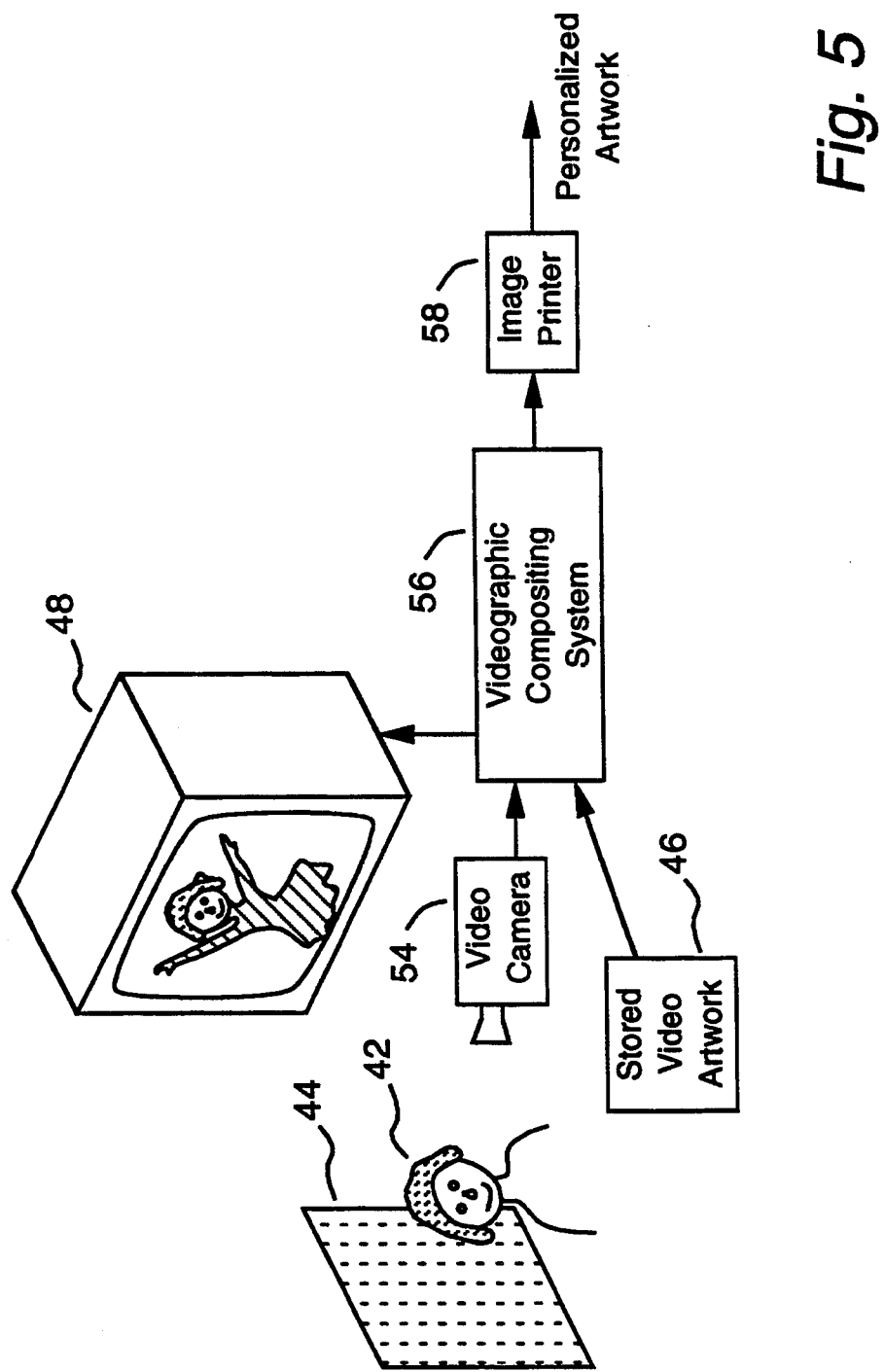
FIG. 5 shows another method of producing personalized artwork for the animated display using a videographic compositing system.

FIG. 5 shows another personalization method and apparatus applicable to the present invention, based on videographic techniques. In this method, rather than use a personalizing photograph, a personalizing face image is captured live from a human subject 42 by a video camera 54. A videographic compositing system 56 is used to combine the image of subject 42 with a stored video artwork 46 representing a character body to be animated. A colored screen 44 behind subject 42 may optionally be used in combination with a chroma-key capability in videographic compositing system 56 to make the process automatic. A composite personalized image is optionally displayed on a video monitor 48, visible to subject 42 or to an operator, to aid in alignment of the image of subject 42 with stored video artwork 46. Personalized artwork may be stored as a video image or printed for use in customizing a display 10 such as shown in FIG. 4. Using this method it is possible to make a subject-operated or customer-operated compositing station, similar to a photo-booth, which delivers personalized artwork 40 to be mounted in display 10.

In yet another embodiment of the present invention, the combination of a predetermined animated character image and a personalizing photographic image may be effected entirely electronically, using computer or videographic techniques, with the finished display presented on an electronic medium such as a television or computer screen, rather than by physically moving artwork parts. For example, a clock image resembling display 10 of FIG. 2 can be displayed on a computer screen.

These and other methods of assembling personalizing face images and character body images into animated personalized displays clearly fall within the scope of the present invention. Products based on such methods fall within the scope of this invention both before and after the personalizing operation, and may be described as personalizable or personalized.

Summary, Ramifications, and Scope

Thus the reader will see that displays constructed according to the present invention can be widely and easily used, by children and by adults, to transform a still image of a person into an interesting dynamic display of a selected character type or animal identifiable as that person.

While the above description includes many specificities, these should not be construed as limitations on the scope of the invention, but rather as an example of a preferred embodiment. Many other variations are possible, some of which are mentioned above.

Accordingly, the scope of the invention should be determined not by the examples given, but by the appended claims and their legal equivalents.

I claim:

1. The combination of:
   (a) a personalizable animated character display clock, including a character image, one or more movable image parts representing movable portions of a character depicted in said character image, and a clock drive mechanism coupled to rotate said one or more movable image parts relative to said character image; and
   (b) a means for personalizing said character image with an image of a person's face.

2. The combination recited in claim 1 in which said means for personalizing is a computerized image compositing means.

3. The combination recited in claim 1 in which said means for personalizing is a photographic image compositing means.

4. The combination recited in claim 1 in which said means for personalizing comprises an opening in said character image and a means for mounting a photograph behind said opening.

* * * * *